US006710945B1

(12) United States Patent
Miranda (10) Patent No.: US 6,710,945 B1
(45) Date of Patent: Mar. 23, 2004

(54) INJECTION MOLDED LENS-BARREL ASSEMBLY AND METHOD FOR FABRICATING LENS-BARREL AND MOUNT ASSEMBLIES

(75) Inventor: John Armando Miranda, Chandler, AZ (US)

(73) Assignee: Amkor Technology, Inc., Chandler, AZ (US)

( * ) Notice: Subject to any disclaimer, the term of this patent is extended or adjusted under 35 U.S.C. 154(b) by 102 days.

(21) Appl. No.: 10/161,963

(22) Filed: Jun. 3, 2002

(51) Int. Cl.[7] ................................................ G02B 7/02
(52) U.S. Cl. ....................... 359/819; 359/811
(58) Field of Search ................................. 359/811, 815, 359/819

(56) References Cited

U.S. PATENT DOCUMENTS

| 4,318,135 A | 3/1982 | Allis et al. |
| 4,457,017 A | 6/1984 | Onogi et al. |
| 4,591,901 A | 5/1986 | Andrevski |
| 4,594,613 A | 6/1986 | Shinbori et al. |
| 4,803,557 A | 2/1989 | Bridges |
| 5,267,043 A | 11/1993 | Rottner et al. |
| 5,559,556 A | 9/1996 | Kagebeck |
| 5,612,826 A * | 3/1997 | Ohshita ........................ 359/819 |
| 5,828,409 A | 10/1998 | North et al. |
| 5,867,368 A | 2/1999 | Glenn |
| 6,117,193 A | 9/2000 | Glenn |
| 6,156,242 A | 12/2000 | Saito et al. |
| 6,266,197 B1 | 7/2001 | Glenn et al. |

FOREIGN PATENT DOCUMENTS

| JP | 05-253975 | 10/1993 |
| JP | 07-294793 | 11/1995 |
| JP | 08-164566 | 6/1996 |
| JP | 08-194146 | 7/1996 |
| JP | 09-234774 | 9/1997 |
| JP | 10-193396 | 7/1998 |

* cited by examiner

Primary Examiner—Hung X. Dang
(74) Attorney, Agent, or Firm—Weiss, Moy & Harris, P.C.

(57) ABSTRACT

An injection molded lens-barrel assembly and method for fabricating lens-barrel and mount assemblies provides a low cost precision optical front end for digital cameras. A barrel is injection-molded around a lens, securing the lens in place. Alternatively, the lens-barrel assembly may be injection molded in one molding stage having two steps. A transparent material is injected to form a lens and an opaque compatible material is injected to form the barrel, yielding a single part that may be mounted to a digital camera. Multiple lens assemblies may be produced by incorporating an alignment feature on each lens to hold the lenses in an external mold fixture. One or more supporting structures are then molded around the multiple lenses, securing them in mechanical alignment.

26 Claims, 6 Drawing Sheets

INJECTION MOLDED LENS-BARREL ASSEMBLY AND METHOD FOR FABRICATING LENS-BARREL AND MOUNT ASSEMBLIES

FIELD OF THE INVENTION

The present invention relates generally to plastic optical components and more specifically, to a method and assembly providing a low cost plastic optical lens system that includes a lens, barrel and mount.

BACKGROUND OF THE INVENTION

Low cost optical components are needed to provide the optical front-end for a variety of devices that have entered the marketplace in the past few years. CMOS image sensors, when compared to charge-coupled-device (CCD) arrays, provide a low cost imaging semiconductor solution for digital cameras, mobile telephones and other optical sensing devices.

In particular, webcams and low cost security systems using similar cameras provide remote observation and security videotaping sources in the workplace and in the home. In some instances cameras are being installed in public places. The demand for low cost cameras has brought about the need for not only a low cost semiconductor imaging solution, but for a low cost optical front end as well.

Typically, the optical front end of a low cost camera includes at least one lens, a cylindrical barrel surrounding and retaining the lens, and a mount for securing the barrel to the camera. The lens is made of a transparent plastic material or glass and the barrel is made of an opaque plastic material so that light can only enter the barrel from an end of the barrel. The mount is usually another plastic part in which the barrel may be inserted.

The optical front end of a low cost camera sometimes includes a mount for attaching the barrel to the camera and an infrared (IR) filter for filtering IR light from entering the semiconductor image sensor. The IR filter is typically adhered to the bottom of the mount and the barrel is fixed to the top of the mount once the module is focused.

During fabrication of the camera, the lens is inserted in the barrel and aligned (typically by forcing the lens against a circumferential ring or step molded or inserted within the barrel). The lens is then secured with an adhesive to hold the lens in place. The assembly of the lens barrel assembly requires a degree of precision commensurate with the optical resolution and other requirements for the camera. As the resolution of the image sensor increases and as the sophistication of camera applications likewise increase, the quality of the optical system must rise to meet the performance requirements of the rest of the camera. In a high-volume low-cost manufacturing environment, maintaining the above-described level of quality is challenging. Also, the adhesive connection may fail when subjected to thermal stress or moisture.

One alternative to the adhesive attached lens-barrel assembly is a one-shot molded lens-barrel assembly. The one-shot assembly is typically a polycarbonate molded piece and is transparent. The barrel of the above-described assembly must then be treated with an opaque paint or inserted within another opaque sleeve in order to prevent light from entering the lens from undesired angles. Treatment of the barrel in the above-described molded part raises the cost of the lens-barrel assembly and also affects durability in that a painted assembly is subject to environmental wear and a lens-barrel-sleeve assembly may separate due to vibration and if glued with an adhesive is subject to the same potential environmental failures as described above for the glued lens-barrel assembly.

Further, as the sophistication of semiconductors cameras increase and as further functions such as focus and zoom are added to high volume applications, multiple lens assemblies are required for the optical front end. Typically these assemblies are manufactured in a manner similar to that described above for a single lens assembly, but with multiple lenses and multiple spacers between the lenses. The multiple lens system and the use of multiple spacers further adds difficulty in holding precision tolerances in a high-volume low cost manufacturing process.

Therefore, it would be desirable to provide a method and system that provide a low cost lens-barrel assembly having precision tolerances. It would further be desirable to provide a low-cost lens-barrel assembly including multiple lenses having precision tolerances. It would also be desirable to mount an assembly, having single or multiple lenses, onto an image sensor assembly (chip on substrate) that does not require focusing.

SUMMARY OF THE INVENTION

The above stated objectives are achieved in methods and lens-barrel assemblies molded to form one integral unit. The lens-barrel assembly may be molded to form one contiguous part from a transparent material and an opaque material, or a barrel may be injection molded around an inserted lens, securely retaining the lens. An alternative assembly provides multiple lenses each having an alignment feature for aligning the lens within a molding tool, whereby each of the lenses can be precisely located with respect to each other via mating features for mating with an external mold, and a supporting structure molded at the periphery of the lenses for retaining the lenses in permanent alignment.

BRIEF DESCRIPTION OF THE DRAWINGS

The invention, as well as a preferred mode of use and advantages thereof, will best be understood by reference to the following detailed description of illustrative embodiments when read in conjunction with the accompanying drawings, wherein like reference numerals indicate like parts throughout.

DETAILED DESCRIPTION

Figure 1A:
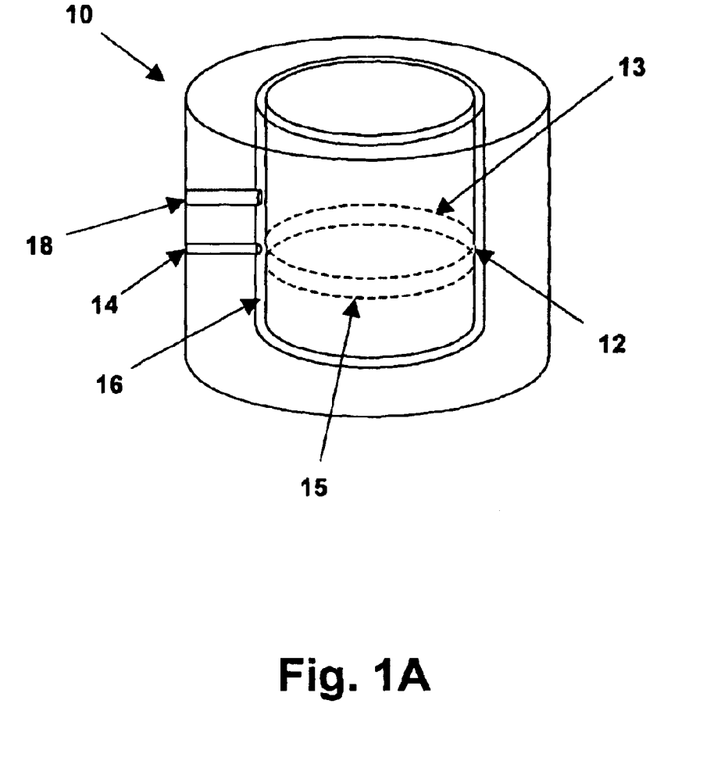
FIG. 1A is a perspective view illustrating a lens-barrel mold for fabricating a lens-barrel assembly according to an embodiment of the present invention.
Figure 1B:
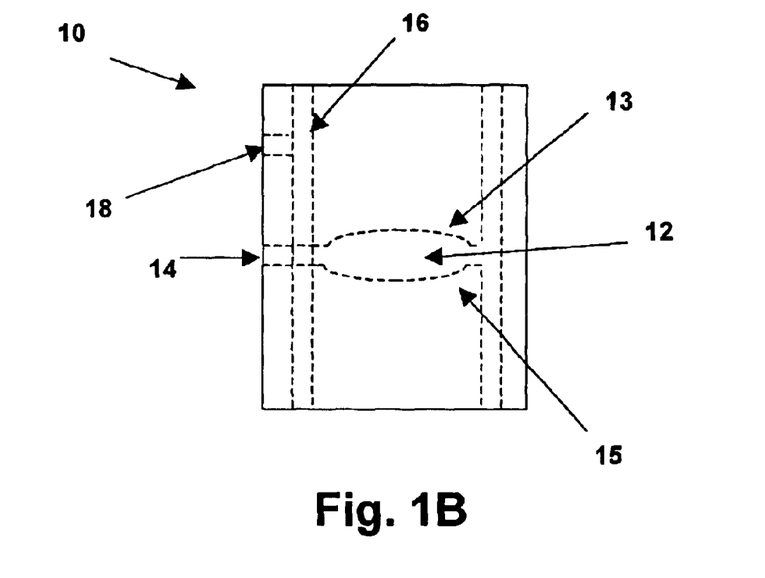
FIG. 1B is a cross-sectional view of the mold of FIG. 1A illustrating the locations of interior features of the mold.

Referring now to FIGS. 1A and 1B, an injection-molding fixture 10 for fabricating a lens-barrel assembly in accordance with an embodiment of the invention is depicted. Mold 10 includes an inner lens-forming region 12 having a first injection point 14 whereby a transparent plastic material may be injected. After the transparent plastic material has been injected and has sufficiently set, a barrel-forming region 16 is accessed via a second injection point 18, whereby an opaque plastic material may be injected to form a barrel around the lens. While only two injection points are depicted, it will be understood by those skilled in the art of injection-molding that multiple injection points may be used to improve flow, and in particular, the use of multiple injection paths to form the barrel will generally be required due to the large area thin wall. An upper surface 13 and a lower surface 15 are shaped to provide the required lens characteristics for lens-forming region 12 so that the injection-molded lens has the proper shape for the required optical characteristics.

The lens will be formed by injection molding a transparent plastic material as described above, and the barrel will typically be insert-molded over the lens by injecting an opaque plastic material, although this is not a limitation of the invention. Further, the materials used to form the lens and barrel may be compatible chemically and in melting point range whereby a transition region is formed that contains a portion of both materials forming a welded transition region. Alternatively, the lens may be molded from a material having a higher melting point and/or completely set after molding so that the barrel forms no bond with the lens and the lens is retained only by the structure of the barrel wherein barrel material is located both above and below the lens, retaining the lens by mechanical interlock.

Figure 2:
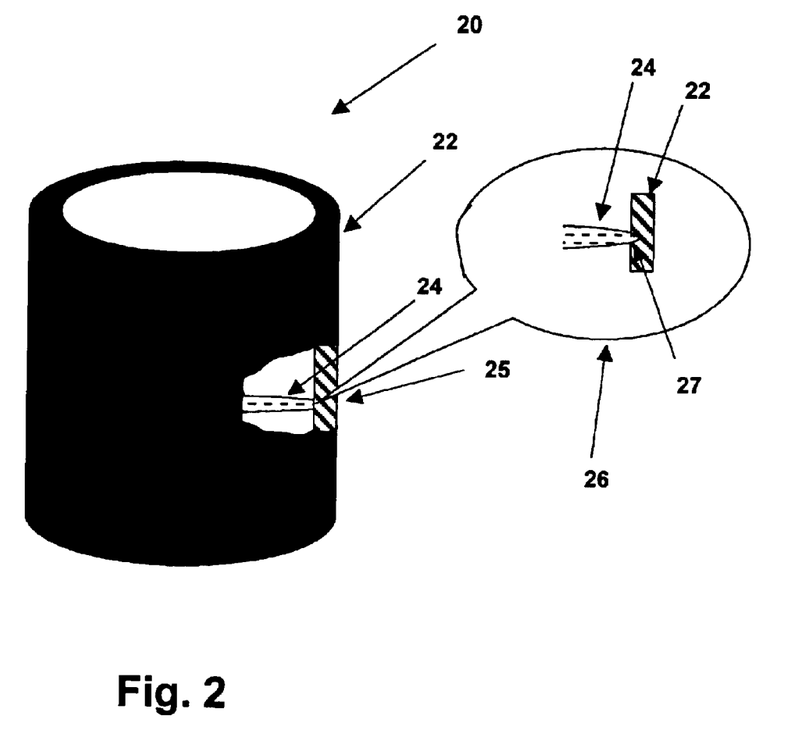
FIG. 2 is a pictorial view of a lens-barrel assembly in accordance with an embodiment of the invention.

Referring now to FIG. 2, an injection-molded optical lens-barrel assembly as may be produced by the mold of FIGS. 1A and 1B is depicted. Barrel 22 is injection molded around lens 24, securing lens 24 in optical alignment with barrel 22. Cutaway 25 shows the detail of one possible interface between barrel 22 and lens 24, but other interfaces that include raised features on barrel 22 around the periphery of lens 24 may be molded on the inside of barrel 22. Balloon 26 shows the edge of lens 24 embedded in the wall of barrel 22 and a transition region 27 containing both of the plastic materials used to mold barrel 22 and lens 24 if the melting point and chemistry of the plastic materials are compatible. Otherwise, no transition region will be formed, but lens 24 will still be mechanically secured by the formation of barrel 22 around lens 24.

Figure 3A:
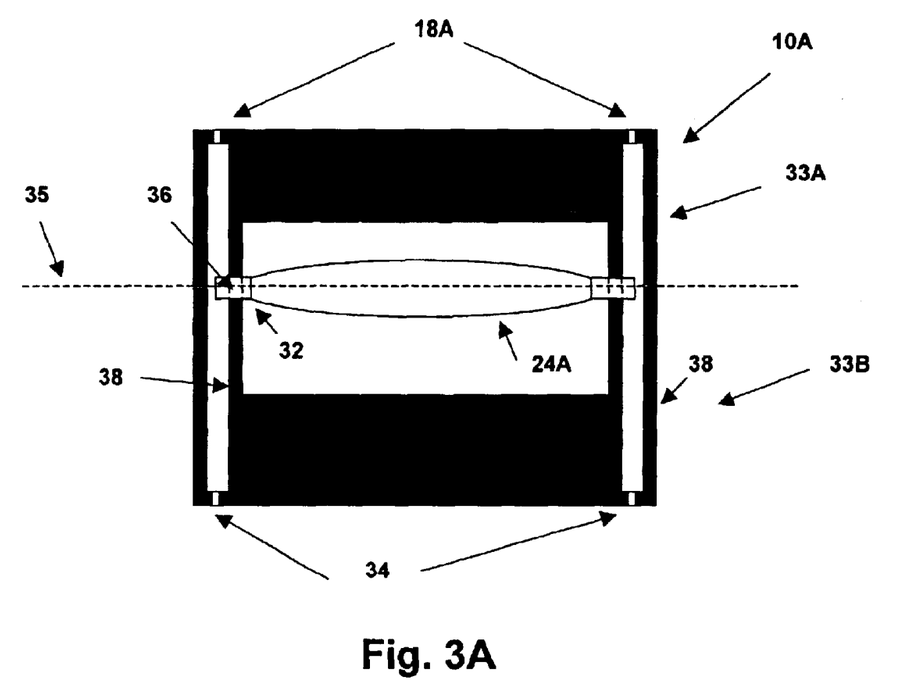
FIG. 3A is a cross-sectional view illustrating a lens-barrel mold for fabricating a lens-barrel assembly according to another embodiment of the present invention.
Figure 3B:
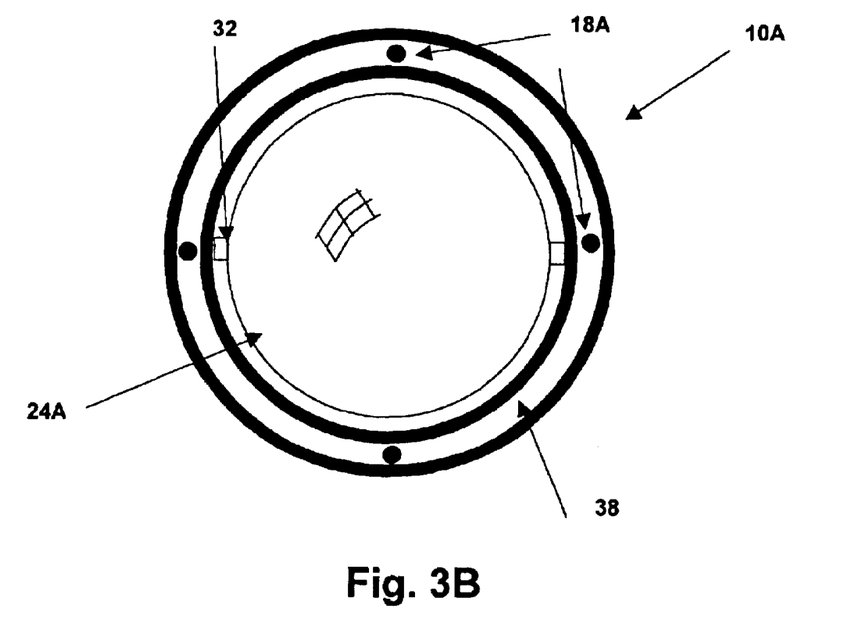
FIG. 3B is an end view of the mold of FIG. 3A.

Referring now to FIGS. 3A and 3B, a mold 10A for injection molding a lens-barrel assembly in accordance with an alternative embodiment of the invention is depicted. In the depicted embodiment, a prefabricated lens 24A including alignment features (tabs) 32 is inserted in mold 30, which has mating features (cut-outs 36) that accept alignment features 32, holding lens 24A securely within mold 10A. Injection points 18A and vents 34 are provided on mold 10A to permit injection of the barrel material to fill barrel channels 38. Parting line 35 shows the separation point for mold that provides for separation of upper mold portion 33A and lower mold portion 33B after the barrel material has set. The above-described alternative embodiment provides a means for insert-molding a barrel over a a prefabricated lens and the alignment features on the lens and mold provide a high precision optically aligned lens-barrel assembly.

Figure 4A:
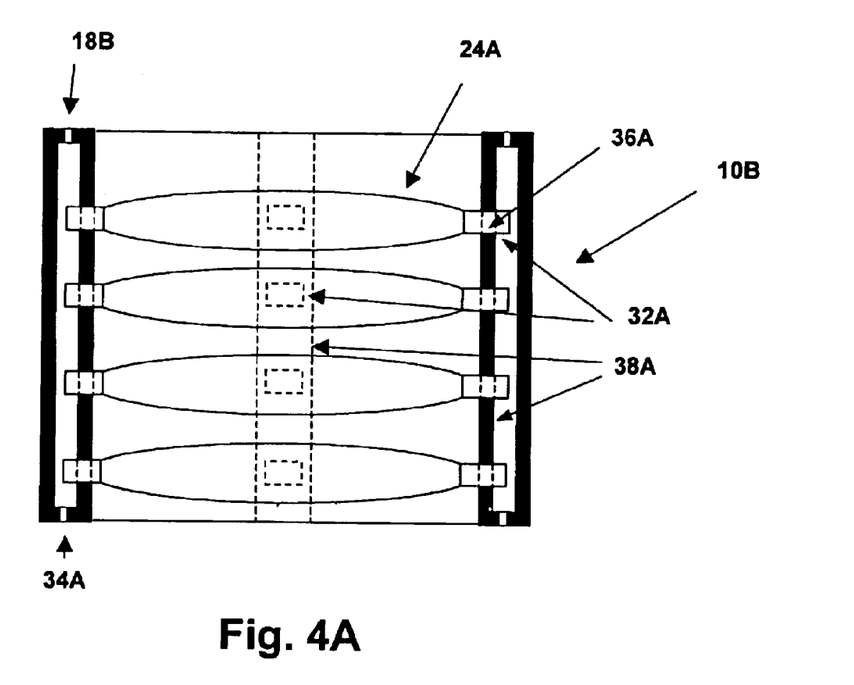
FIG. 4A is a cross-sectional view illustrating a lens-barrel mold for fabricating an optical assembly according to another embodiment of the present invention.
Figure 4B:
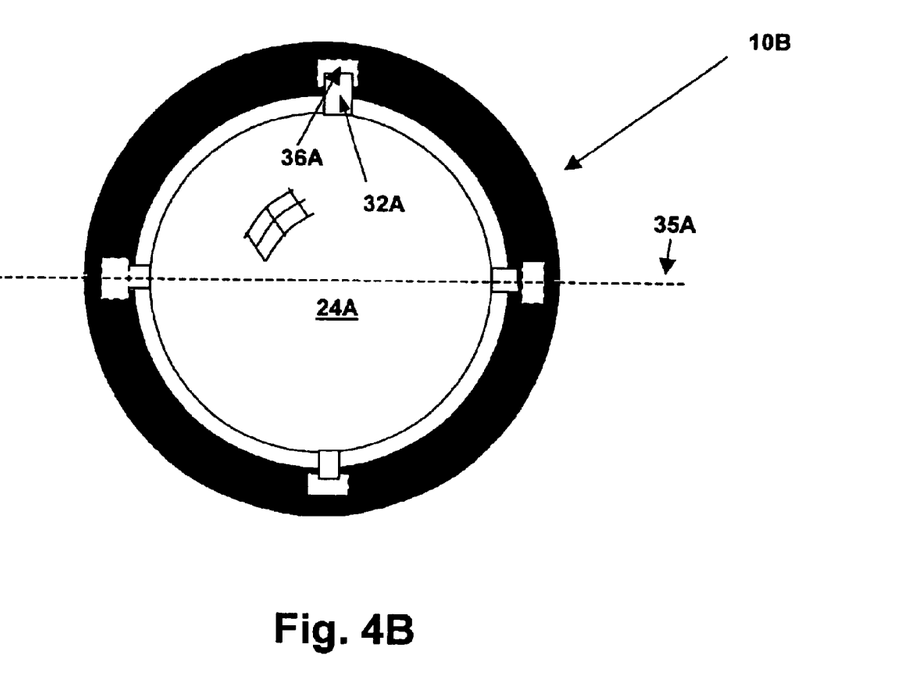
FIG. 4B is an end view of the mold of FIG. 4B.

Referring now to FIGS. 4A and 4B, a mold 10B for injection molding an optical assembly having multiple lenses in accordance with another alternative embodiment of the invention is depicted. Mold 10B is used to form optical assemblies comprising multiple lenses for providing enhanced optical performance, e.g., light filtering, higher magnification, narrowed optical field, etc. Molding a multiple lens assembly presents a difficulty in that the barrel of the above-described embodiments cannot be molded around multiple lenses. Parting a mold in the vertical direction permits no mold features between the lenses and parting a mold horizontally provides no wall between the lenses for preventing the barrel material from entering the spaces between the lenses.

Therefore, in order to secure multiple lenses in optical alignment, an optical assembly comprising a plurality of struts disposed on the periphery of the lenses has been devised. At least two struts are used to secure the edges of the lenses and preferably three or more struts can be used to provide rigidity in all planes of possible motion of the lenses.

Mold 10B is parted and multiple lenses 24B (which may be of differing type although identical convex-convex lenses are depicted)are inserted in one of the mold halves. Mating features (slots 36A) retain alignment features (tabs 32A) of lenses 24A, securing lenses 24A in optical alignment. Slot channels 38A are provided with injection points 18B and vents 34A to permit injection molding of struts at the periphery of lenses 24A. Mold 10B is parted at parting line 35A after the strut material has set, providing an optical assembly comprising lenses 24A and a plurality of struts disposed-around the edges of lenses 24A.

In the depicted embodiment, the struts comprise uniform rectangular volumes that enclose tabs 32A after the assembly is completed, but molds can be designed that inject plastic into depressions molded or machined into alternative types of lenses as well, providing protrusions from struts that lock the lenses in optical alignment. For example, the lenses may define a curved or V-shaped groove around the periphery of the lens and the mold may provide apertures at the inner surface of the struts (at the periphery of the lenses) that permit the strut material to flow into sections of the groove, thus securing lenses 24A in optical alignment. Another variation contemplated is an assembly wherein the strut material between the lenses, i.e. integumentary portions of the struts, has a differing cross section that will generally be smaller than the portions of the struts providing the mating features that lock with the alignment features on the lenses. Other variations of the strut profile and alignment feature/mating feature design are possible and are contemplated as being in accordance with alternative embodiments of the present invention.

Figure 5A:
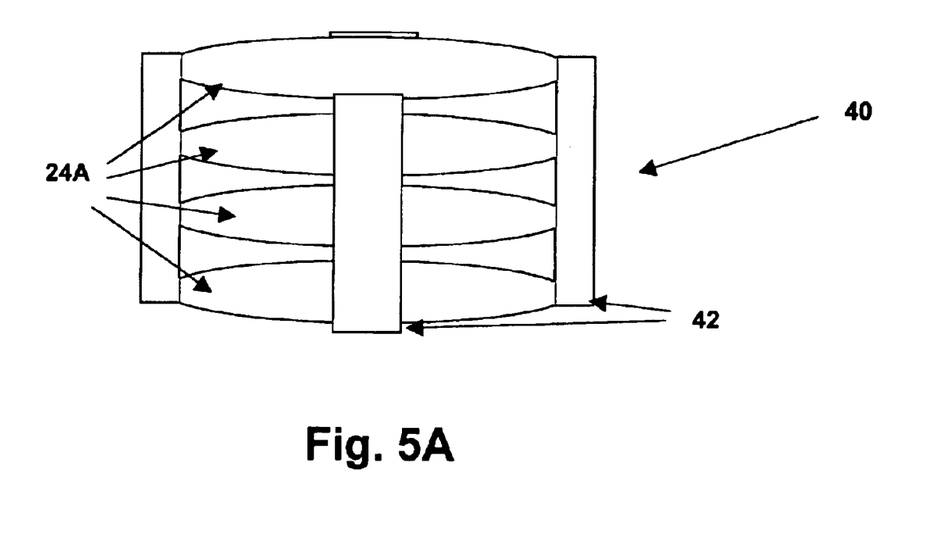
FIG. 5A is a pictorial view illustrating an optical assembly in accordance with another embodiment of the invention.
Figure 5B:
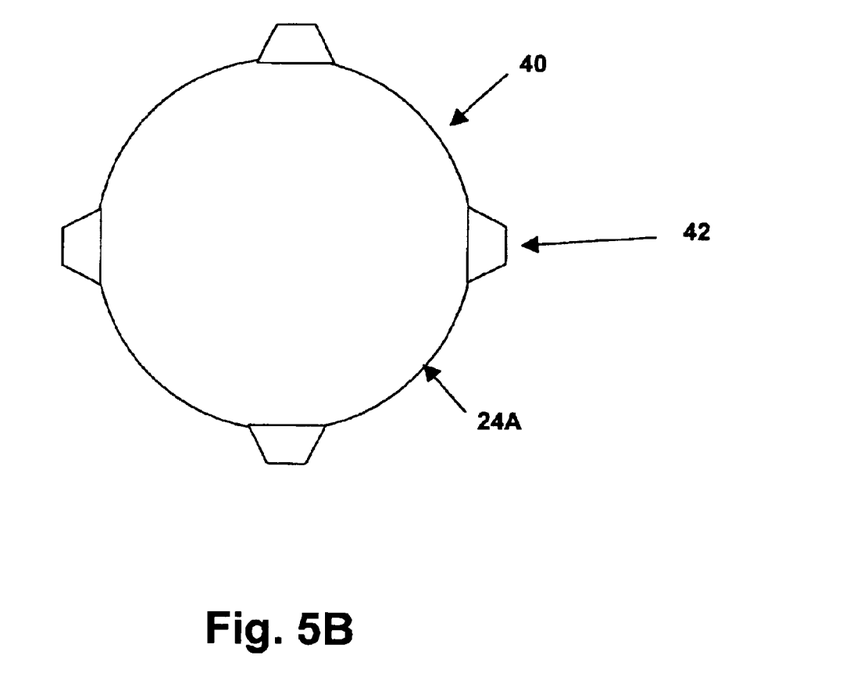
FIG. 5B is an end view of the optical assembly of FIG. 5A.

Referring now to FIGS. 5A and 5B, a multiple lens optical assembly 40 in accordance with an alternative embodiment is depicted. Optical assembly 40 is an optical assembly as may be fabricated using mold 10B and comprises four struts 42, disposed around the periphery of lenses 24A. As depicted in FIG. 5B, the walls of the struts 42 are slanted, providing improved mold release, and although the depiction of mold 10B does not show slanted walls, they will generally be desirable for reliably releasing optical assembly 40 from mold 10B. In particular, the strut channels 38A that are not located on a parting line of the mold will generally have slanted walls. There is no restriction that any struts 42 are molded at a parting line of the mold, but such a mold may facilitate insertion of lenses 24A. Mating features may be located within the mold portions or formed by is the portions of the mold at the parting line and the mold may be made of multiple strut-forming sub-molds rather than two cylindrical halves as depicted.

Figure 6A:
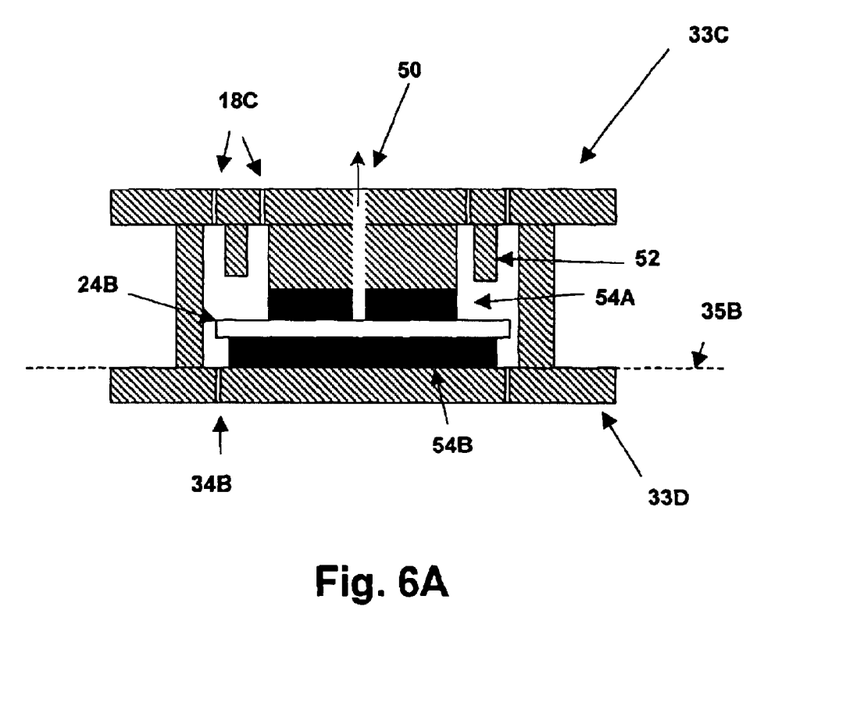
FIG. 6A is a cross-sectional view illustrating a mold for fabricating a mount for a lens-barrel assembly according to another embodiment of the present invention.

Referring now to FIG. 6, a cross-sectional view of a mold for fabricating a mount for a lens-barrel assembly according to another embodiment of the present invention is depicted. The techniques of the present invention may be used to produce a mount incorporating an infrared (IR) filter by insert molding a glass or plastic IR filter in the barrel described above, or in the mount depicted in FIG. 6. The technique of FIG. 6 can be applied to an end of a barrel, as well, for end-mounting a lens or an IR filter. While the mold as depicted is a mold for producing a cylindrical mount (or a cylindrical barrel end), the strut configuration of FIGS. 5A and 5B may also include an end-mounted lens or IR filter and the end-mounted portion can include a fully cylindrical-cross section at the end, or the strut structure can continue around the end-mounted lens or IR filter.

An upper mold portion 33C is secured to a lower mold portion 33D at parting line 35B after an IR filter 24B is secured to upper mold portion via a vacuum applied to vacuum port 50. A cylindrical annulus 52 of upper mold portion 33C produces a channel for mounting a cylindrical barrel. Flexible mold walls 54A and 54B are affixed to the remainder of mold portions 33C and 33D to provide a mating surface for IR filter 24B that will not damage IR filter which may be glass. Flexible mold walls 54A and 54B are generally made of Nylon, Kapron or a polyimide, providing a surface that can compress slightly when mold portions 33C and 33D are brought together. A liquid plastic material is injected through injection ports 18C and air escapes through vents 34B, resulting in a molded mount that retains IR filter 24B securely in the longitudinal (optical) axis by plastic material molded above and below IR filter 24B.

Figure 6B:
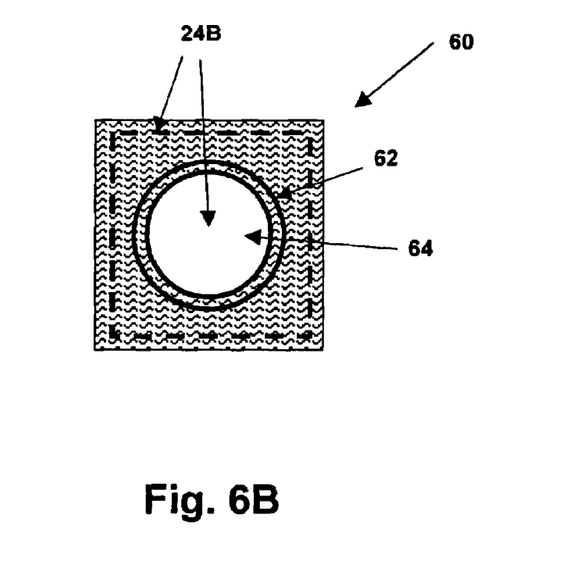
FIG. 6B is a top view showing a mount in accordance with an embodiment of the present invention.

Referring now to FIG. 6B, a mount 60 in accordance with an embodiment of the invention that may be produced using the mold of FIG. 6A is depicted. IR filter 24B is secured within mount 60, and a central void area 64 permits light to pass through IR filter 24B. Barrel mounting ring 62 surrounds IR filter 24B, and a barrel may be glued or thermo-plastically interlocked or welded within barrel mounting ring 62.

Figure 6C:
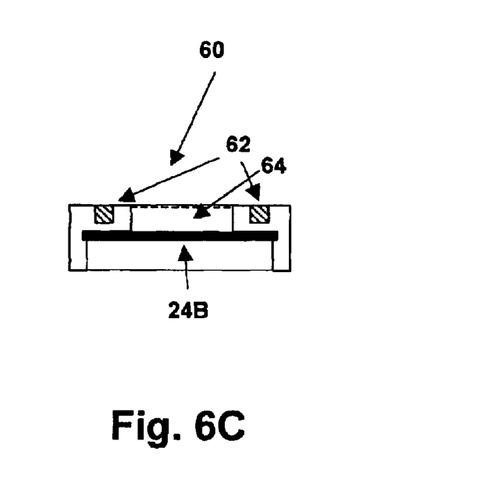
FIG. 6C is a side cross-sectional view depicting a mount in accordance with an embodiment of the present invention.

Referring to FIG. 6C, a cross sectional view of mount 60 shows the location of barrel mounting ring 62 around central void area 64, with IR filter 24B secured within mount 60 by plastic molded around the top and bottom surfaces at the periphery of IR filter 24B.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A molded plastic optical assembly, comprising:
    a lens composed of a first transparent material; and
    a cylindrical barrel injection-molded from a plastic material around a periphery of said lens whereby said lens is mechanically secured in both directions along the longitudinal axis of said barrel.

2. The molded plastic optical assembly of claim 1, wherein said lens comprises a prefabricated lens, and wherein said barrel is injection molded around said lens.

3. The molded plastic optical assembly of claim 2, wherein said lens comprises an alignment feature for retaining said lens in alignment with a mold during injection molding of said barrel and wherein said alignment feature is retained within said assembly after said barrel is injection molded.

4. The optical assembly of claim 2, wherein the mount is injection molded from the opaque plastic material forming a contiguous assembly with the barrel.

5. The molded plastic optical assembly of claim 1, wherein said lens comprises an injection-molded plastic lens, and wherein said barrel is insert molded around said lens.

6. The molded plastic optical assembly of claim 1, wherein said barrel is injection molded from an opaque plastic material.

7. The molded plastic optical assembly of claim 6, wherein said lens is injection molded at a first injection point within a mold, wherein said transparent plastic material is injected and wherein said barrel is insert molded around said lens by injecting said opaque plastic material at a second injection point of said mold.

8. The molded plastic optical assembly of claim 7, comprising an attachment transition region comprising the transparent plastic material and the opaque plastic material, whereby the lens is secured in optical alignment with the barrel.

9. The optical assembly of claim 1, further comprising a mount coupled to the barrel for securing the optical assembly to a device.

10. The optical assembly of claim 1, wherein the lens is an infrared filter.

11. The optical assembly of claim 10, wherein the barrel is a mount for securing said infrared filter, and wherein the mount has features for subsequent mounting of another barrel.

12. The optical assembly of claim 11, wherein the infrared filter has a rectangular cross-section, and wherein the mount is a cylinder having a rectangular cross-section defining a void on a top side of said mount having a cylindrical cross-section.

13. A method for manufacturing an optical assembly, comprising:
    locating a lens composed of a first transparent material within an injection molding fixture; and
    injecting a plastic material into said injection molding fixture to form a barrel around said lens, whereby said lens is mechanically secured in both directions along the longitudinal axis of said barrel by material molded around the periphery of said lens.

14. The method of claim 13, wherein said locating is performed by first injection molding a transparent plastic material within said injection molding fixture at a first injection point, and wherein said injecting to form a barrel is performed by second injecting a plastic material within said injection molding fixture at a second injection point.

15. The method of claim 14, wherein said second injecting injects an opaque plastic material for forming an opaque barrel.

16. The method of claim 14, further comprising aligning an alignment feature on said lens with a mating feature on said injection molding feature, whereby said lens is retained in place during said injecting.

17. The method of claim 13, wherein the lens is an infrared filter having a rectangular outline, and wherein the barrel is a mount having features for mounting another barrel.

18. A molded plastic optical assembly, comprising:
   a plurality of lenses composed of a first transparent material; and
   a plurality of retaining struts injection molded from a plastic material and disposed longitudinally at points on the periphery of said lenses, whereby said lenses are mechanically secured in optical alignment.

19. The molded plastic optical assembly of claim 18, wherein each of said lenses comprises an alignment feature for retaining said lens in alignment with a mold during injection molding of said plurality of struts and wherein said alignment features are retained within said assembly after said struts are injection molded.

20. The molded plastic optical assembly of claim 19, wherein said alignment features are retained within said plurality of struts after said struts are injection molded.

21. The molded plastic optical assembly of claim 19, wherein said struts comprise substantially rectangular volumes molded around said alignment features and integumentary plastic regions connecting said rectangular volumes.

22. The molded plastic optical assembly of claim 21, wherein the integumentary plastic regions have substantially identical cross-sections to the substantially rectangular volumes whereby each strut consists of a substantially rectangular volume.

23. The molded plastic optical assembly of claim 19, wherein said alignment features are male protrusions disposed at a periphery of each of said lenses.

24. The molded plastic optical assembly of claim 19, wherein said alignment features are female depressions disposed at a periphery of each of said lenses.

25. A method for manufacturing an optical assembly, comprising:
   locating a plurality of lenses composed of a first transparent material in optical alignment within an injection molding fixture; and
   injecting a plastic material into said injection molding fixture to form a plurality of struts disposed around a periphery of said lenses, whereby each of said lenses is mechanically secured in both directions along their optical axis by said molded struts.

26. The method of claim 25, wherein said locating is performed by mating alignment features disposed at a periphery of each of said lenses with corresponding features within said mold.

* * * * *